(No Model.)
F. B. BADT.
ELECTRIC RAILWAY SYSTEM.
No. 525,480. Patented Sept. 4, 1894.
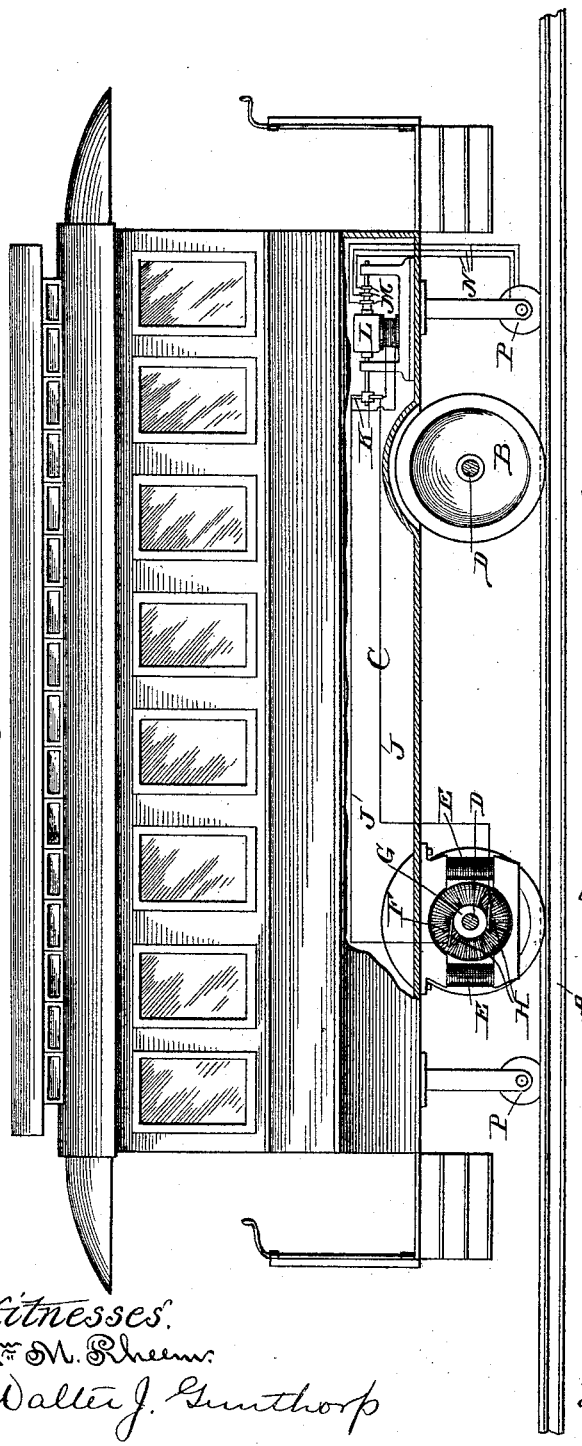
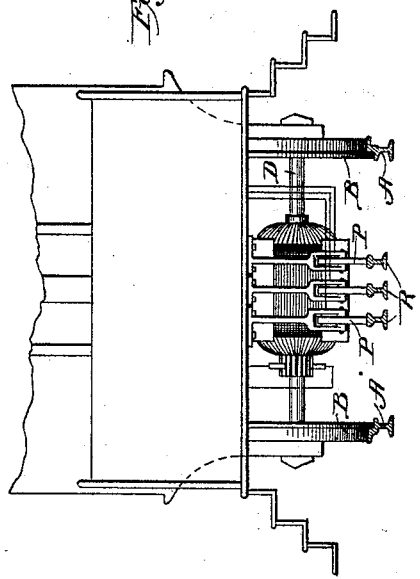
Witnesses:
Inventor
Francis B. Badt

United States Patent Office.

FRANCIS B. BADT, OF CHICAGO, ILLINOIS.

ELECTRIC-RAILWAY SYSTEM.

SPECIFICATION forming part of Letters Patent No. 525,480, dated September 4, 1894.

Application filed October 22, 1892. Serial No. 449,894. (No model.)

*To all whom it may concern:*

Be it known that I, FRANCIS B. BADT, a subject of the King of Prussia, residing at Chicago, Cook county, Illinois, have invented a new and useful Improvement in Electric Street-Railways, of which the following is a specification.

My invention relates to electric street railways and particularly to devices for supplying power to the same, and has for its object to provide means for driving street cars or the like from, or by means of, multiphase currents.

It is illustrated in the accompanying drawings, wherein—

Figure 1, is a side view of a car containing my improvements, with parts removed or broken away. Fig. 2, is a cross section through the car and track with certain parts removed.

Like parts are indicated by the same letter in all the figures.

A A are rails upon which the car wheels B B run.

C is the body of the car having the axle D suitably associated with a direct current motor having the field magnets E E, armature F, commutator G and brushes H H from which lead the conductors J. These conductors lead to brushes K K on the commutator at one end of the motor transformer L, which is provided with three brushes M M on its other end to receive multiphase current from the three local conductors N N which lead from the trolleys P P on the three insulated rails R R on the track bed between the traction rails. I do not show the means for leading current to these rails, as that is made in part the subject matter of an application filed February 19, 1892, Serial No. 422,160, of which this is a division. Moreover this multiphase current could be led to the car in various ways and I do not wish to here limit myself to any particular means of supplying current to the car. There may be more than three wires as shown but I simply indicate three here for convenience.

The use and operation of my invention are as follows: Assuming the car provided substantially as shown with the devices herein illustrated there would be by the proper manipulation of the trolleys multiphase currents delivered over a three-wire system to the car, and these multiphase currents would therefore be led to the motor transformer which would be properly situated upon the car at any convenient point. A direct current would then be delivered by the motor transformer to the direct current motor, thus operating it and driving the car.

I claim—

1. The combination of a movable vehicle with a motor transformer thereon adapted to be operated by an external multiphase supply circuit, conductors leading from this supply circuit to such movable vehicle, one or more direct current motors on such vehicle attached or geared to the vehicle axle or axles, and connections from the motor transformer to such direct current motor or motors.

2. The combination of a movable vehicle with a motor transformer thereon adapted to be operated by an external multiphase supply circuit, conductors leading from this supply circuit to such movable vehicle, one or more direct current motors on such vehicle attached or geared to the vehicle axle or axles, and connections from the motor transformer to such direct current motor or motors, and devices to make or break the circuit to the direct current motor and to regulate the speed of such motor, said devices located in the circuit connecting the transformer to the direct current motor or motors.

FRANCIS B. BADT.

Witnesses:
FRANCIS W. PARKER,
WALTER J. GUNTHORP.